US012602325B2

(12) United States Patent
Goennheimer et al.

(10) Patent No.: US 12,602,325 B2
(45) Date of Patent: Apr. 14, 2026

(54) CACHING STRATEGY DETERMINATION AND INJECTION

(71) Applicant: SAP SE, Walldorf (DE)

(72) Inventors: Joachim Goennheimer, Walldorf (DE); Sven Sterbling, Heidelberg (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 18/335,351

(22) Filed: Jun. 15, 2023

(65) Prior Publication Data

US 2024/0419596 A1    Dec. 19, 2024

(51) Int. Cl.
*G06F 12/0837* (2016.01)
*G06F 12/0817* (2016.01)

(52) U.S. Cl.
CPC ...... *G06F 12/0837* (2013.01); *G06F 12/0824* (2013.01)

(58) Field of Classification Search
CPC .......................... G06F 12/0837; G06F 12/0824
USPC .......................................................... 711/118
See application file for complete search history.

(56) References Cited

U.S. PATENT DOCUMENTS

| | | | | |
|---|---|---|---|---|
| 7,581,064 | B1 * | 8/2009 | Zedlewski | G06F 12/084 |
| | | | | 711/119 |
| 10,868,742 | B2 | 12/2020 | Chitalia et al. | |
| 11,157,501 | B2 | 10/2021 | Demazeau et al. | |
| 2008/0147974 | A1 | 6/2008 | Madison et al. | |
| 2012/0110111 | A1 * | 5/2012 | Luna | H04L 67/04 |
| | | | | 709/213 |
| 2018/0143911 | A1 * | 5/2018 | Moyer | G06F 12/0888 |
| 2019/0124174 | A1 * | 4/2019 | Wu | H04L 67/568 |
| 2020/0201775 | A1 | 6/2020 | Zhang et al. | |
| 2021/0216456 | A1 * | 7/2021 | Flores | G06F 12/127 |
| 2023/0059940 | A1 | 2/2023 | Shankar et al. | |
| 2024/0089339 | A1 * | 3/2024 | Thatikonda | G06F 16/172 |

FOREIGN PATENT DOCUMENTS

WO          2023014940 A1     2/2023

OTHER PUBLICATIONS

Choi, Jinhwan et al., "Learning-based Dynamic Cache Management in a Cloud", Journal of Parallel and Distributed Computing, arXiv:1902. 00795v1 [cs.DC], Feb. 2, 2019, https://arXiv.org/pdf/1902.00795, 13pgs.

* cited by examiner

*Primary Examiner* — Jared I Rutz
*Assistant Examiner* — Wei Ma
(74) *Attorney, Agent, or Firm* — Buckley, Maschoff & Talwalkar LLC

(57)          ABSTRACT

Systems and methods include determination of caching requirements associated with an application, automatic determination of a caching strategy based on the caching requirements and metadata describing a plurality of available caches, providing the caching strategy to the application, and execution of the application to cache data based on the caching strategy.

20 Claims, 7 Drawing Sheets

200

S210

Determine Caching Requirements Associated With
An Application

S220

Determine Caching Strategy Based On Caching
Requirements And On Metadata Defining
Available Caches

S230

Provide Caching Strategy And Cache Metadata To
Application

S240

Execute Application To Use Available Caches
Based On Caching Strategy And Cache Metadata

| CPU USAGE | TOTAL CACHE SIZE | AVERAGE OBJECT SIZE | CACHE MISS % | CACHE HIERARCHY | TIMEOUT | EVICTION STRATEGY |
|---|---|---|---|---|---|---|
| <30% | <1GB | <5KB | >1% | PS | 60000 | LFU |
| <30% | <10GB | >5KB | >1% | LCE -> PS | 120000 | LFU |
| ~ | ~ | ~ | ~ | ~ | ~ | ~ |
| ~ | ~ | ~ | ~ | ~ | ~ | ~ |

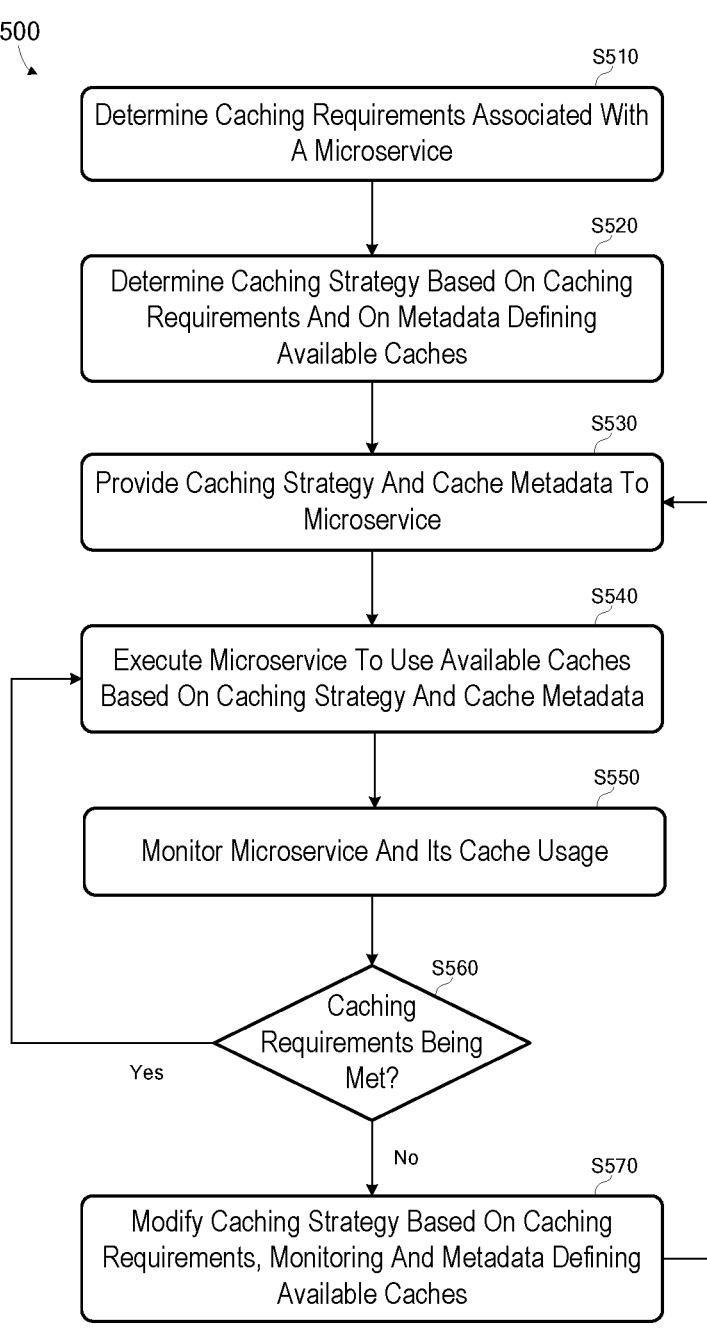

500

S510

Determine Caching Requirements Associated With A Microservice

S520

Determine Caching Strategy Based On Caching Requirements And On Metadata Defining Available Caches

S530

Provide Caching Strategy And Cache Metadata To Microservice

S540

Execute Microservice To Use Available Caches Based On Caching Strategy And Cache Metadata

S550

Monitor Microservice And Its Cache Usage

S560

Caching Requirements Being Met?

Yes

No

S570

Modify Caching Strategy Based On Caching Requirements, Monitoring And Metadata Defining Available Caches

*FIG. 5*

CACHING STRATEGY DETERMINATION AND INJECTION

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more platform-as-a-service (PaaS) providers. Any number of the computing systems may comprise cloud-based systems (e.g., providing services using scalable-on-demand virtual machines).

Caching is a programming technique which is used to increase application performance and efficiency. A cache is a hardware and/or software component which stores data separately from the primary data source (e.g., a database) and from which data can be acquired faster than the primary data source. The data stored in the cache might include, for example, data which has been recently accessed from the primary data source, data of the primary data source which is expected to be needed soon, or the result of a prior computation.

During execution, a service may query its available caches for required data. A cache hit occurs when the required data is located in a cache, and a cache miss occurs when it is not. If none of the available caches include the data, the service requests the data from the (presumably slower) primary data source. Accordingly, the responsiveness of the service typically increases as the percentage of required data stored in available caches (i.e., the ratio of cache hits to cache misses) increases. It is therefore desirable to cache data in a manner which maximizes the percentage of cache hits without consuming unacceptable levels of computing resources (e.g., cache memory).

In cloud-based environments, users expect elasticity and speed regardless of workload. To meet these expectations, cloud application providers maintain dedicated cache hierarchies and attempt to implement suitable caching strategies (e.g., what data to store in a cache, in which cache to store the data, and how long to cache the data) in their applications. Since the caches at each level of a cache hierarchy often exhibit different characteristics and care must be taken to ensure the caches remain in sync, it is quite difficult for a typical application developer to determine and implement a suitable caching strategy. These difficulties are exacerbated in a microservices architecture, in which interoperating distributed applications have differing caching needs and caching strategies. Moreover, a caching strategy is hard-coded into an application and does not change during application execution regardless of performance of the application.

What is needed are systems to efficiently identify and deploy suitable caching strategies within one or more applications.

BRIEF DESCRIPTION OF THE DRAWINGS

FIG. 3 is a tabular representation of a portion of strategy metadata according to some embodiments.

FIG. 5 is a flow diagram of a process to determine, provide and update caching strategies according to some embodiments.

DETAILED DESCRIPTION

The following description is provided to enable any person in the art to make and use the described embodiments. Various modifications, however, will remain readily-apparent to those in the art.

Some embodiments operate to determine a caching strategy based on caching requirements of an application. The caching requirements may be specified by a developer of the application and may include, for example, a total cache size, an average object size, and a maximum cache miss percentage. The determined caching strategy may specify the caches to be used by the application, a timeout value, and a cache eviction strategy, for example.

The caching strategy, and information usable to access the caches specified by the caching strategy, are then provided to the application. During execution, any caching required by the application is performed so as to confirm to the caching strategy. Consequently, the desired caching performance may be achieved without requiring the developer to design and implement a suitable caching strategy.

According to some embodiments, monitoring data is acquired during execution of the application. The monitoring data may indicate performance of the application, status of the available caches, and cache usage. Based on the monitoring data, it may be determined to change the prior caching strategy to a new caching strategy. The new caching strategy may then be provided to the application for caching in accordance therewith.

Figure 1:
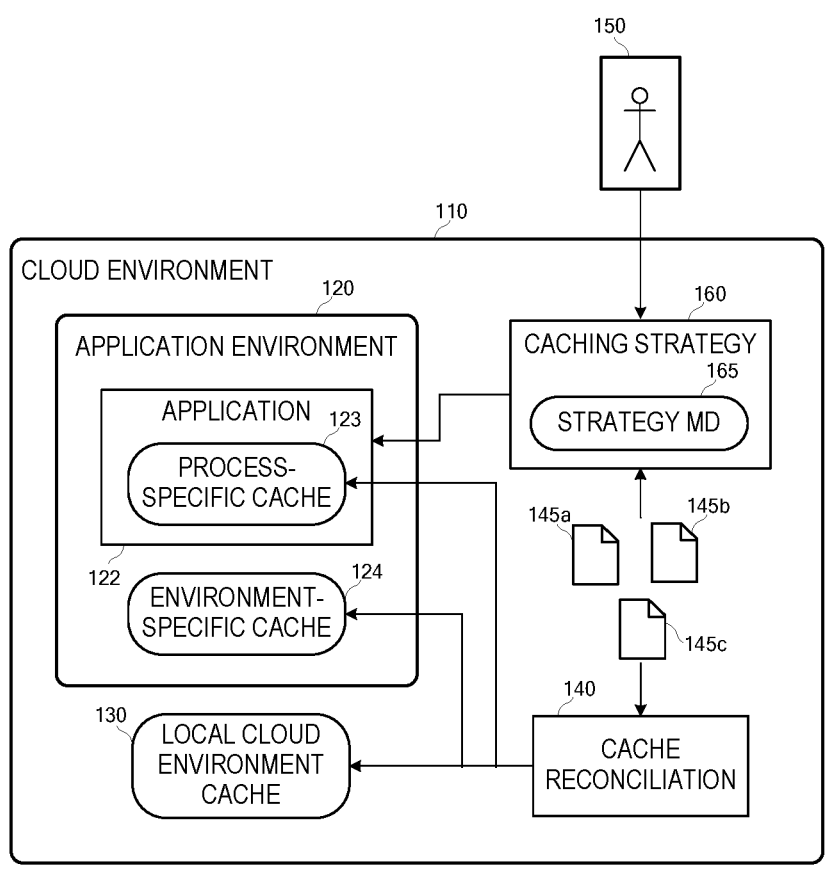
FIG. 1 illustrates a system including a cache hierarchy and components to determine and provide caching strategies for use by an application according to some embodiments.

FIG. 1 illustrates a system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Cloud environment 110 may comprise disparate cloud-based services, a single computer server, a cluster of servers, and any other combination that is or becomes known. In some embodiments, cloud environment 110 comprises a microservice-based cloud-native system utilizing a Kubernetes cluster. Kubernetes is an open-source system for automating deployment, scaling and management of containerized applications.

A Kubernetes cluster consists of many nodes, which in turn may comprise physical servers and/or virtual machines. A node executes an application within a software container. One or more containers may be grouped into a pod, where each container of a given pod shares the same computing resources and local network. Application environment 120 may therefore comprise a computer server or a virtual machine executing application 122.

For purposes of the present description, the terms "application" and "service" will be used to describe program code which is executable to cause execution of desired functions. For clarity, an application is described as standalone program code while a service is described as program code which interoperates with one or more other services (e.g., in a microservices architecture) to provide desired functionality. The terms may be used interchangeably, in that a service may also be considered an application and vice versa.

Each cache described herein may be implemented using any form of electronic data storage that is or becomes known. The electronic data storage may be volatile (e.g., random access memory) or non-volatile (e.g., non-volatile random access memory, Flash memory). A cache may be standalone or distributed, and may include replication functionality to provide robustness and/or to facilitate access from different geographic regions. Any cache described herein may be managed by a system which provides a key-value database, cache and message broker, and optional durability, such as Redis.

Application 122 is associated with process-specific cache 123, which is accessible only to a process in which application 122 executes. Process-specific cache 123 may be enabled by pre-existing libraries or module hooked into application 122. Access to a cache indicates an ability to write data to and read data from a cache. Access to a cache by a process may also imply a degree of control over data, such as an ability to dictate an eviction policy applied to data written to the cache by the process.

The process in which application 122 executes may also access environment-specific cache 124. All other processes executed within application environment 120 may access environment-specific cache 124. Local cloud environment cache 130 is accessible to any process executed by any application environment of cloud environment 110. Local cloud environment cache 130 may be implemented by a server or virtual machine separate from application environment 120.

Caches 123, 124 and 130 define a cache hierarchy according to some embodiments. Typically, access by application 122 to cache 123 is faster than access by application 122 to cache 124, and access by application 122 to cache 124 is faster than access by application 122 to cache 130. The sizes of caches 123, 124 and 130 may exhibit an inverse relationship to the speed with which application environment 120 may access the caches.

Caches 123, 124 and 130 may exhibit other different characteristics. For example, each of caches 123, 124 and 130 may be associated with different availability guarantees. In another example, cache 130 may be located in a different geographic location than caches 123 and 124. Embodiments are not limited to these examples of differing characteristics.

Metadata 145a, 145b and 145c describe characteristics of caches 123, 124 and 130, respectively. Such characteristics may include but are not limited to cache size, number of replicas, cloud environment in which the cache resides, leader election protocol, and availability guarantees. Using the Kubernetes nomenclature, metadata 145a, 145b and 145c may define custom resources, i.e., caches of various levels of a cache hierarchy.

Each of metadata 145a, 145b and 145c may describe characteristics of all caches of a particular cache hierarchy level. For example, metadata 145a may describe characteristics of all process-specific caches, metadata 145b may describe characteristics of all environment-specific caches, and metadata 145c may describe characteristics of all local cloud environment caches. It should be noted that all caches of a particular cache hierarchy level need not share identical characteristics. Moreover, embodiments are not limited to the association of each of metadata 145a, 145b and 145c with a particular cache hierarchy level.

Cache reconciliation operator 140 monitors metadata 145a, 145b and 145c and ensures that the caches of cloud environment 110 conform thereto. If one of metadata 145a, 145b and 145c experiences a create/update/delete event, operator 140 creates/updates/deletes a corresponding cache of cloud environment 110.

User 150 may be a developer, administrator, or other user of application 122. Caching strategy component 160 may provide an interface via which user 150 may specify caching requirements of application 122. These caching requirements may comprise any suitable parameters relating to the caching of data by application 122. Caching requirements may include but are not limited to a total cache size, an average object size, and a maximum cache miss percentage. The caching requirements may include different caching requirements for different types of data (e.g., critical and non-critical, personally-identifying data and non-personally-identifying data).

As will be described in more detail below, caching strategy component 160 uses strategy metadata 165 to determine a caching strategy based on the received caching requirements and on metadata 145a, 145b and 145c defining the caches available to application 122. Metadata 145a, 145b and 145c is therefore advantageously used to both create/update/delete the caches of cloud environment 110 and to determine a caching strategy for application 122. A caching strategy according to a non-exhaustive example may specify one or more of caches 123, 124 and 130, an eviction strategy for each specified cache, and a timeout value for each specified cache.

Strategy metadata 165 may comprise a decision table or decision tree, for example, which outputs a caching strategy based on input caching requirements. The decision table or decision tree may be constructed, in advance or on-the-fly, to map the caching requirements to a caching strategy based on metadata 145a, 145b and 145c. In some examples, caching strategy component 160 implements suitable logic to determine a caching strategy based on the received caching requirements and the characteristics of the available caches specified within metadata 145a, 145b and 145c.

Caching strategy component 160 provides, or injects, the determined caching strategy to application 122. In some embodiments, application 122 executes within a container of environment 120 and the caching strategy is represented by values of environment variables which are injected into the container.

Consequently, during execution, application 122 caches its data according to the injected caching strategy. According to some embodiments, once executing application 122 determines data to cache, application 122 passes the data to a caching module (which may be integrated into application 122). The caching module interprets the caching strategy and caches the data received from application 122 in one or more of caches 123, 124 and 130 according to the caching strategy.

Figure 2:
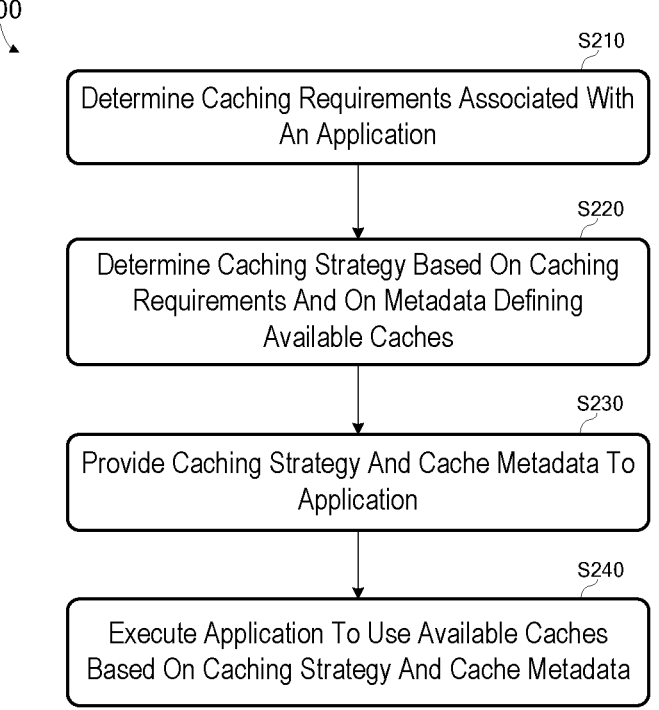
FIG. 2 is a flow diagram of a process to determine and provide caching strategies according to some embodiments.

FIG. 2 comprises a flow diagram of process 200 to determine and provide caching strategies according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to process 200, it is assumed that one or more caches have been instantiated in a manner accessible to an application. The caches are associated with metadata defining characteristics of the caches and accessible to a component executing process 200 (e.g., caching strategy component 160). The caches may comprise a cache hierarchy and the caches may have been created using suitable Kubernetes custom resource definitions and a corresponding operator such as cache reconciliation operator 140. The custom resource definitions may comprise the metadata mentioned above.

Initially, at S210, caching requirements associated with an application are determined. The caching requirements may be received from a developer of the application, a network administrator, or other user. In some embodiments, no caching requirements are received and the caching requirements determined at S210 are default caching requirements previously provided to, for example, caching strategy component 160. According to one example, the determined caching requirements are: Expected total cache size in bytes=102400 kb); Expected average object size=10 kb; and Accepted Cache Miss Percentage=10%.

A caching strategy is determined at S220 based on the caching requirements and on metadata defining the available caches. For example, caching strategy component 160 uses strategy metadata 165 to determine a caching strategy based on the caching requirements determined at S210 and on metadata 145a, 145b and 145c defining caches 123, 124 and 130. Any suitable logic and/or data may be employed at S220 to determine a caching strategy.

FIG. 3 is a tabular representation of a portion of strategy metadata 165 used to determine a caching strategy according to some embodiments. Embodiments are not limited to the data types and data values of FIG. 3. Strategy metadata 165 includes caching requirement parameters 310. The values of each row of parameters 310 may be compared against the determined caching requirements at S220 to identify a row having values which best satisfy the caching requirements. Once a row is identified, the values of the same row of caching strategy parameters 320 are determined. Next, caches which satisfy the determined values of caching strategy parameters 320 are identified based on the cache-defining metadata.

Continuing the example of the above-specified caching requirements, the first row of metadata 165 may be identified at S220 and the caching strategy is therefore determined from the values of caching strategy parameters 320 of the first row, i.e., Cache Hierarchy=process-specific-cache, Timeout=60000 ms, Eviction Strategy=Least Frequently Used. It may then be determined based on metadata 145a that process-specific cache 123 satisfies these values.

Next, at S230, the caching strategy and cache metadata are provided to the application. For example, caching strategy component 160 may instruct application 122 to use process-specific cache 123 and to employ a timeout of 60000 ms and a Least Frequently Used eviction strategy. Moreover, caching strategy component 160 may provide metadata which may be needed to access cache 123 (e.g., endpoint information, authorization credentials). Application 122 is then executed at S240 to serve user requests. During execution, application 122 caches its data according to the provided caching strategy and cache metadata.

Figure 4:
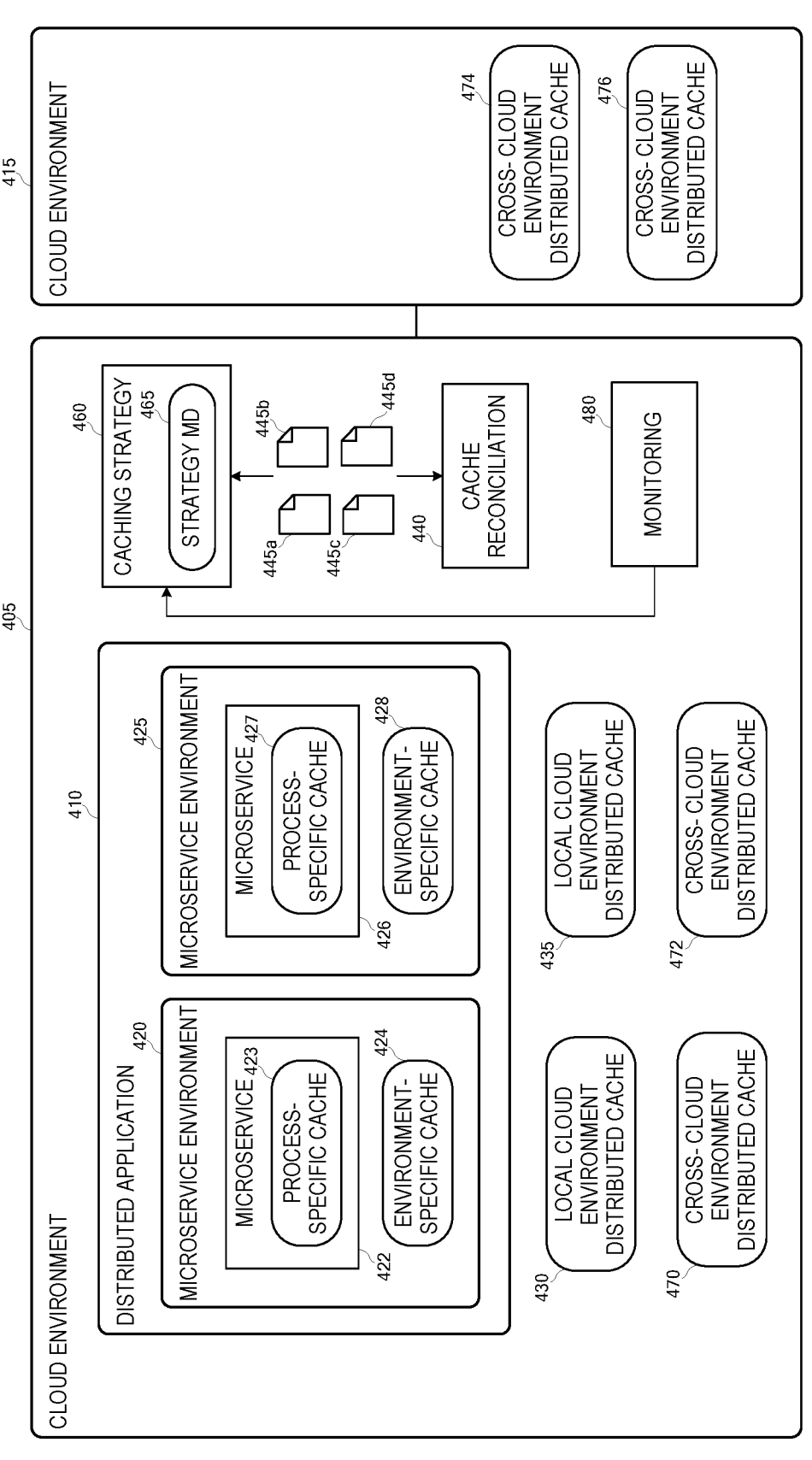
FIG. 4 illustrates a system including a cache hierarchy and components to determine, provide and update caching strategies for use by a distributed application according to some embodiments.

FIG. 4 illustrates an architecture including cloud environments 405 and 415. Each of cloud environments 405 and 415 may be implemented in any of the manners described above with respect to cloud environment 110.

Cloud environment 405 implements distributed application 410 consisting of microservices 422 and 426 executing in respective microservice environments 420 and 425. Microservices 422 and 426 may comprise a same microservice or different microservices. Microservice environments 420 and 425 may be implemented as described above with respect to application environment 120.

The cache hierarchy of FIG. 4 differs from the cache of FIG. 1. Process-specific cache 423 is accessible only to microservice 422 and environment-specific cache 424 is accessible only to microservices/applications executing in microservice environment 420. Similarly, process-specific cache 427 is accessible only to microservice 426 and environment-specific cache 428 is accessible only to microservices/applications executing in microservice environment 425. Local cloud environment distributed caches 430 and 435 are accessible to any microservice/application executing in cloud environment 405. Caches 430 and 435 may be implemented using any caching system which supports distributed caches (e.g., Redis).

Cloud environment 405 also includes cross-cloud environment distributed caches 470 and 472. Caches 470 and 472 are synchronized with cross-cloud environment distributed caches 474 and 476 of cloud environment 415. Caches 470, 472 are accessible to any microservice/application executing in cloud environment 405 and caches 474, 476 are accessible to any microservice/application executing in cloud environment 415.

The architecture of FIG. 4 includes four levels of cache hierarchy. Caches at each hierarchical level are defined by respective metadata 445a-445d. As mentioned above, other logical relationships between metadata 445a-445d and the caches of FIG. 4 may be employed in some embodiments. Cache reconciliation operator 440 operates as described above to conform the caches of cloud environment 405 to metadata 445a-445d.

Caching strategy component 460 determines caching strategies for each of microservices 422 and 426 based on caching requirements of microservices 422 and 426, strategy metadata 465 and corresponding metadata of metadata 445a-445d. Component 460 may determine a different caching strategy for each of microservices 422 and 426.

Caching strategy component 460 provides the determined caching strategies to microservices 422 and 426. Each of microservices 422 and 426 then caches its data according to its received caching strategy. The microservices 422 and 426 may interpret and implement their caching strategies to cache data in one or more of caches 423, 424 (for microservice 422), caches 427, 428 (for microservice 426), and caches 430, 435, 470 and 472 (for either of microservices 422, 426). One or both of microservices 422 and 426 may access a respective caching module which interprets their caching strategy and caches data accordingly.

Monitoring component 480 monitors the caches of cloud environment 405 during operation of microservices 422 and 426. Monitoring component 480 may monitor metrics associated with resource consumption (e.g., CPU utilization, memory utilization, bandwidth consumption), hardware performance (e.g., read/write speeds, bandwidth, CPU speed), cache performance (e.g., hit rate, availability), and any other metrics that are or become known. The data generated for each metric may comprise time-series data and may be generated at different respective time intervals.

Monitoring component 480 may comprise any suitable system to monitor the cache metrics. Monitoring component 480 may comprise Prometheus, a Kubernetes-compatible monitoring system which collects metrics for each service in a cluster and supports monitoring, processing and alerting applications. Monitoring component 480 may query the caches for selected metrics, may subscribe to the selected metrics, may receive metrics pushed from the caches, or may acquire the metrics using any suitable protocol.

Based on the cache metrics, monitoring component 480 may alert caching strategy component 460 to determine a new caching strategy for one or both of microservices 422 and 426. For example, monitoring component 480 may determine, based on the cache metrics, that the caching requirements are not being satisfied. As a result of the alert, caching strategy component 460 may determine new caching strategies for one or both of microservices 422 and 426 as described above, but perhaps also based on the cache metrics which caused triggering of the alert. In this regard, monitoring component 480 may transmit cache metrics to caching strategy component 460 along with any alert transmitted thereto.

In some embodiments, caching strategy component 460 receives cache metrics from monitoring component 480 and determines, based on the cache metrics, whether or not to determine a new caching strategy for one or both of microservices 422 and 426. The determination may be based also or alternatively on any changes to metadata 445a-445d which occur during operation (e.g., creation or deletion of a cache).

FIG. 5 is a flow diagram of process 500 according to some embodiments. Process 500 describes initial determination of a caching strategy for a microservice and on-the-fly modification thereof according to some embodiments.

Caching requirements associated with a microservice are determined at S510. The caching requirements may be received from a developer of the application, a network administrator, or other user. The caching requirements determined at S510 may be default caching requirements in some embodiments.

At S520, a caching strategy is determined based on the caching requirements and on metadata defining the available caches. Caching strategy component 460 may use strategy metadata 465 at S520 to determine a caching strategy based on the caching requirements determined at S510 and on metadata 445a-445d. For purposes of example, the caching strategy may be modified at S570 to Cache Hierarchy=process-specific-cache, Timeout=60000 ms, Eviction Strategy=Least Frequently Used.

The caching strategy and cache metadata are provided to the microservice at S530. The caching strategy (e.g., caches to use, timeout value, cache eviction strategy) and cache metadata (e.g., cache endpoint information, authorization credentials) may be provided using environment variables of the corresponding microservice environment. The microservice may then execute at S540, during which it caches data using the caching strategy and cache metadata. As noted above, the microservice may be one of several microservices which together comprise a distributed application, and S540 may comprise execution of the distributed application.

The microservice and its cache usage are monitored at S550 during execution of the microservice. For example, monitoring component 480 may monitor metrics of all environments and caches of cloud environment 405 during operation of microservice 426. The metrics may comprise any metrics that are or become known. During such monitoring, it is determined at S560 whether the caching requirements are being met. As long as the caching requirements are being met, flow cycles between S540, S550 and S560 to execute the microservice based on the caching strategy, monitor the microservices and the caches, and determine whether the caching requirements are being met.

Flow proceeds from S560 to S570 if it is determined that the caching requirements are not being met. The caching strategy is modified at S570. The modified caching strategy may be determined at S570 based on the caching requirements and the metadata defining available caches as described with respect to S520. Determination of the caching requirements at S570 may also consider metrics determined during the monitoring at S550.

In one example, it is assumed that the caching requirements determined at S510 specify an average object size of <5 kb. However, due to the monitoring at S550, it is determined at S560 that the actual average object size is 10 kb. Moreover, it may be determined at S560 that the microservice has been horizontally scaled and two instances of the microservice are now running instead of one. The resulting caching strategy determined at S570 may be Cache Hierarchy={local-cloud-environment-distributed-cache, process-specific-cache}, Timeout=120000 ms, Eviction Strategy=Least Frequently Used.

Flow then returns to S530 to provide the newly-determined caching strategy to the executing microservice. An instance of process 500 may be executed in parallel for each microservice of a cloud environment, where the caching requirements of and caching strategies determined for each microservice may differ. The caching strategies determined for each microservice may be modified at different times due to the same or different unmet caching requirements.

Figure 6:
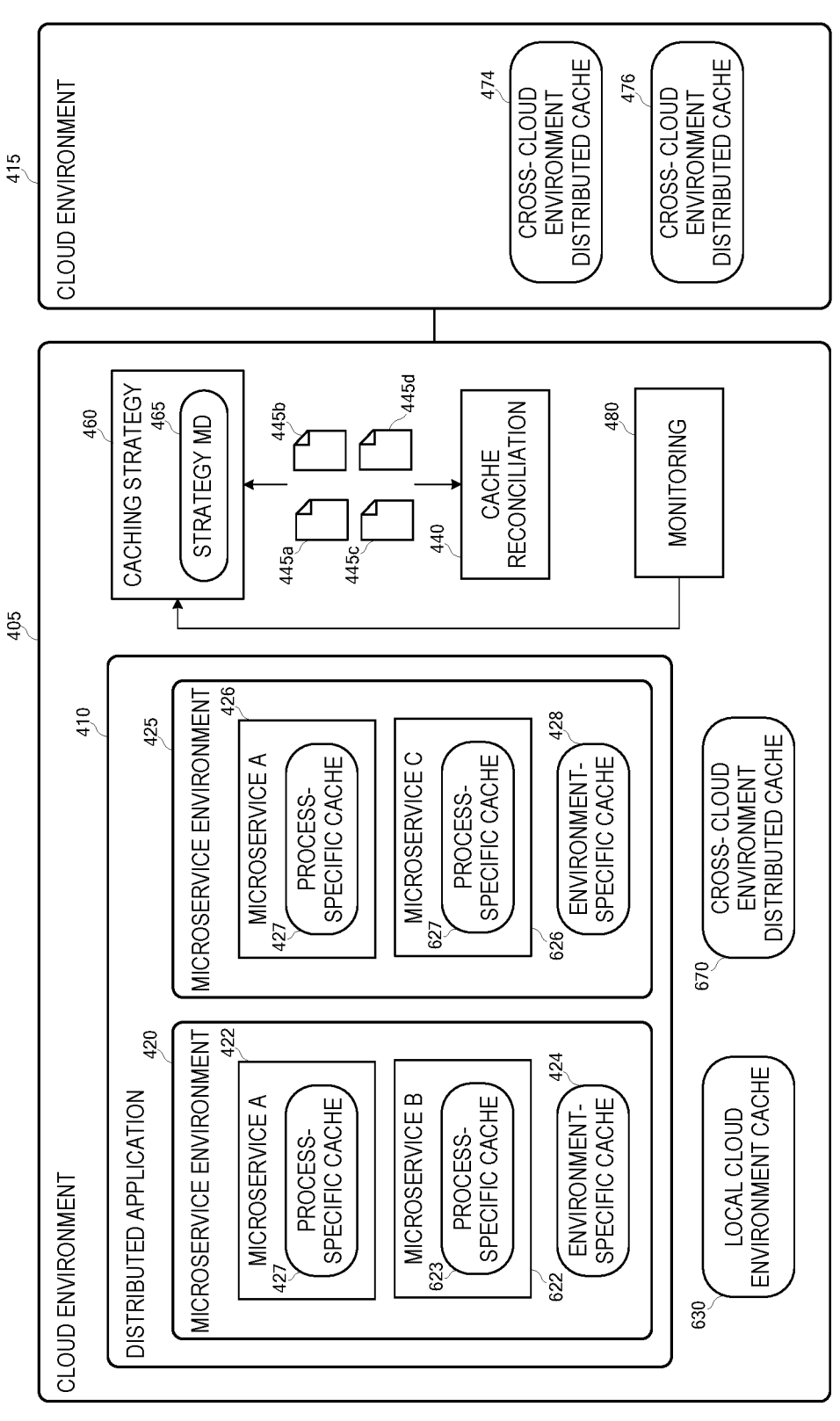
FIG. 6 illustrates a system including a cache hierarchy and components to determine, provide and update caching strategies for use by a distributed application according to some embodiments.

FIG. 6 is a block diagram of cloud environments 405 and 415 of FIG. 4. Microservice environment 420 now executes microservice 622 in addition to microservice 422, and microservice environment 425 now executes microservice 626 in addition to microservice 426. Microservices 622 and 626 may comprise microservices of a same distributed application to which microservices 422 and 426 also belong. According to FIG. 6, microservices 422 and 426 are instances of a same microservice. Embodiments may operate as described with respect to FIG. 5 to determine and provide caching strategies for each of microservices 422, 426, 622 and 626.

Process-specific cache 623 is accessible only to microservice 622 and environment-specific cache 424 is now accessible only to microservices 422 and 622. Similarly, process-specific cache 627 is accessible only to microservice 626 and environment-specific cache 428 is now accessible only to microservices 426 and 626. Metadata 445a-445d defines process-specific caches 623 and 627 as described above. Local cloud environment cache 630 and cross-cloud environment cache 670 remain accessible to all microservices executing in cloud environment 405.

Figure 7:
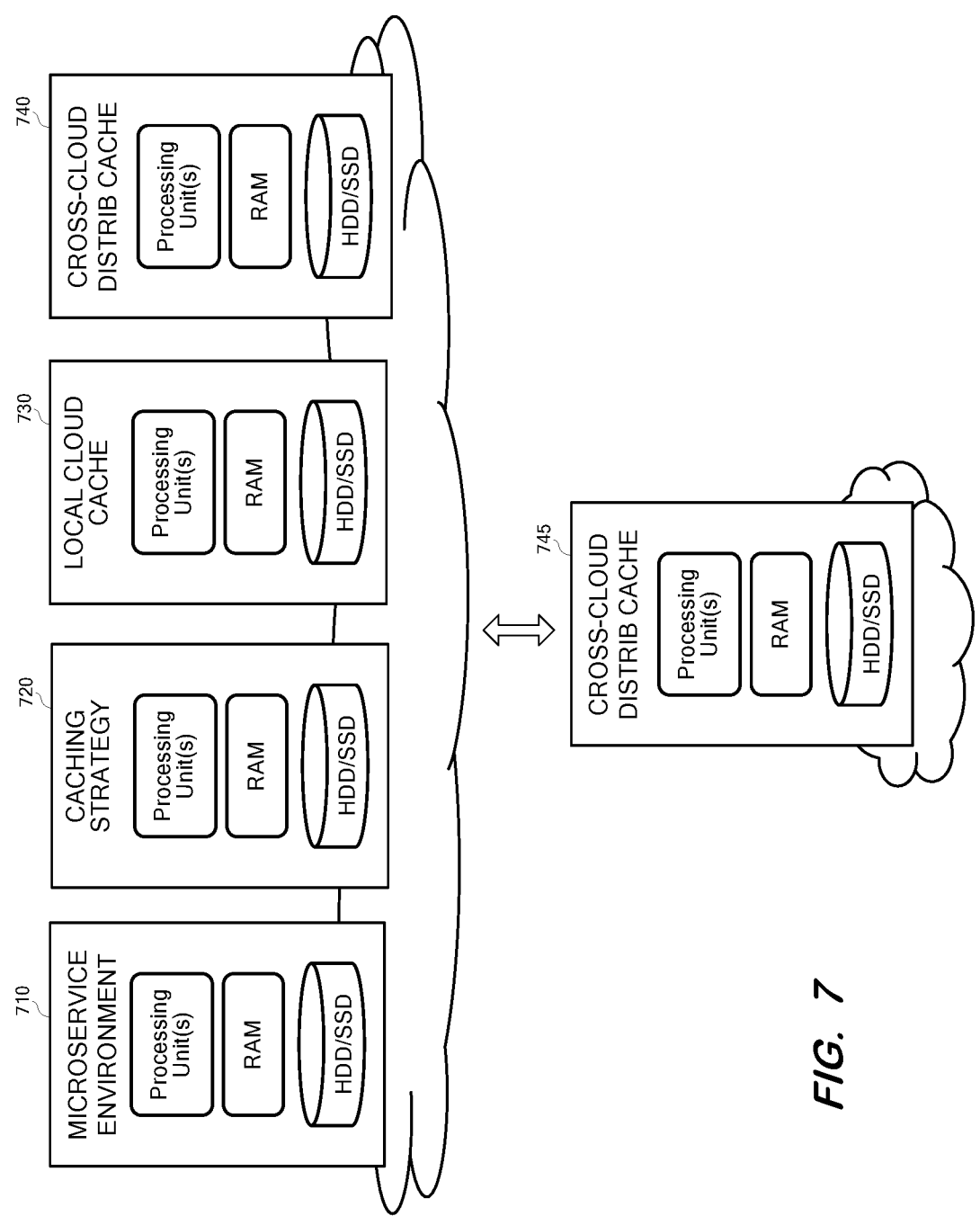
FIG. 7 is a block diagram of cloud-based virtual machines providing a cache hierarchy and components to determine and provide caching strategies for use by a microservice according to some embodiments.

FIG. 7 illustrates cloud environments according to some embodiments. Each illustrated component may comprise cloud-based virtual machines residing in one or more public clouds providing self-service and immediate provisioning, autoscaling, security, compliance and identity management features.

A first cloud environment includes microservice environment 710, caching strategy component 720, local cloud cache 730 and cross-cloud distributed cache 740. A second cloud environment includes cross-cloud distributed cache 745 which operates in conjunction with cross-cloud distributed cache 740. Microservice environment 710 may execute one or more microservices and provides a microservice-specific cache for each of such microservices and an environment-specific cache accessible to all of its microservices. Each microservice executing within microservice environment 710 may also access local cloud cache 730 and cross-cloud distributed cache 740.

Caching strategy component 720 may operate as described above to determine a caching strategy for each microservice executing within microservice environment 710. The caching strategy for each microservice may differ, and the caching strategy for each microservice may be provided to microservice environment 710 for execution by the respective microservices. During execution, a cloud environment monitoring component (not shown) may determine whether caching requirements are being met. If the caching requirements are not being met, caching strategy component 720 may determine a modified caching strategy for each of one or more microservices and provide the one or more modified caching strategies to the appropriate microservice(s) via microservice environment 710.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processing unit to execute the processor-executable program code to cause the system to:
determine caching requirements associated with an application;
automatically determine a caching strategy based on the caching requirements and metadata describing characteristics of each of a plurality of available caches;
provide the caching strategy to the application, in response to which the application caches data based on the caching strategy;
determine a cache miss percentage of the application;

automatically determine a second caching strategy based on the cache miss percentage;
provide the second caching strategy to the application, in response to which the application caches data based on the second caching strategy;
detect a change to the metadata describing a size of one of the plurality of available caches; and
in response to detection of the change, changing the size of the one of the plurality of available caches in conformance with the change to the metadata.

2. A system according to claim 1, further comprising:
a second memory storing second processor-executable program code; and
a second at least one processing unit to execute the second processor-executable program code to cause the system to:
monitor the application to generate monitoring data; and
based on the monitoring data, determine the cache miss percentage.

3. A system according to claim 1, further comprising:
a process cache specific to the application;
an environment cache specific to an execution environment of the application; and
a distributed local cloud environment cache specific to a local cloud environment of the execution environment,
wherein the caching strategy specifies caching data in at least two of the process cache, the environment cache, and the distributed local cloud environment cache.

4. A system according to claim 1, the at least one processing unit to execute the processor-executable program code to cause the system to:
determine second caching requirements associated with a second application;
automatically determine a third caching strategy based on the second caching requirements and the metadata describing the plurality of available caches, the third caching strategy being different from the caching strategy; and
provide the third caching strategy to the second application,
wherein the second application caches data based on the third caching strategy.

5. A system according to claim 4, further comprising:
a process cache specific to the application;
a second process cache specific to the second application;
an environment cache specific to an execution environment of the application;
a second environment cache specific to a second execution environment of the second application; and
a distributed local cloud environment cache specific to a local cloud environment of the execution environment and of the second execution environment,
wherein the caching strategy specifies caching data in at least two of the process cache, the environment cache, and the distributed local cloud environment cache, and
wherein the third caching strategy specifies caching data in at least two of the second process cache, the second environment cache, and the distributed local cloud environment cache.

6. A system according to claim 5, further comprising:
a distributed cross-cloud environment cache,
wherein the caching strategy specifies caching data in at least three of the process cache, the environment cache, the distributed local cloud environment cache and the distributed cross-cloud environment cache, and
wherein the third caching strategy specifies caching data in at least three of the second process cache, the second environment cache, the distributed local cloud environment cache and the distributed cross-cloud environment cache.

7. A system according to claim 4, further comprising:
a second memory storing second processor-executable program code; and
a second at least one processing unit to execute the second processor-executable program code to cause the system to:
monitor the application to generate monitoring data; and
based on the monitoring data, determine the cache miss percentage.

8. A computer-implemented method comprising:
determining caching requirements associated with an application;
automatically determining a caching strategy based on the caching requirements and metadata describing characteristics of each of a plurality of available caches;
providing the caching strategy to the application;
executing the application to cache data based on the caching strategy;
determining a cache miss percentage of the application;
automatically determining a second caching strategy based on the cache miss percentage;
providing the second caching strategy to the application;
executing the application to cache data based on the second caching strategy;
detecting a change to the metadata describing a size of one of the plurality of available caches; and
in response to detecting the change, changing the size of the one of the plurality of available caches in conformance with the change to the metadata.

9. A method according to claim 8, further comprising:
monitoring the application to generate monitoring data;
based on the monitoring data, determining the cache miss percentage.

10. A method according to claim 8, wherein the plurality of available caches comprise:
a process cache specific to the application;
an environment cache specific to an execution environment of the application; and
a distributed local cloud environment cache specific to a local cloud environment of the execution environment, and
wherein the caching strategy specifies caching data in at least two of the process cache, the environment cache, and the distributed local cloud environment cache.

11. A method according to claim 8, further comprising:
determining second caching requirements associated with a second application;
automatically determining a third caching strategy based on the second caching requirements and the metadata describing the plurality of available caches, the third caching strategy being different from the caching strategy;
providing the third caching strategy to the second application; and
executing the second application to cache data based on the third caching strategy.

12. A method according to claim 11, wherein the plurality of available caches comprise:
a process cache specific to the application;
a second process cache specific to the second application;
an environment cache specific to an execution environment of the application;
a second environment cache specific to a second execution environment of the second application; and a distributed local cloud environment cache specific to a local cloud environment of the execution environment and of the second execution environment,
wherein the caching strategy specifies caching data in at least two of the process cache, the environment cache, and the distributed local cloud environment cache, and
wherein the third caching strategy specifies caching data in at least two of the second process cache, the second environment cache, and the distributed local cloud environment cache.

13. A method according to claim 12, wherein the plurality of available caches comprise:
a distributed cross-cloud environment cache,
wherein the caching strategy specifies caching data in at least three of the process cache, the environment cache, the distributed local cloud environment cache and the distributed cross-cloud environment cache, and
wherein the third caching strategy specifies caching data in at least three of the second process cache, the second environment cache, the distributed local cloud environment cache and the distributed cross-cloud environment cache.

14. A method according to claim 11, further comprising:
monitoring the application to generate monitoring data; and
based on the monitoring data, determining the cache miss percentage.

15. A non-transitory computer-readable medium storing processor-executable program code, the program code executable by a computing system to:
determine caching requirements associated with an application;
automatically determine a caching strategy based on the caching requirements and metadata describing characteristics of each of a plurality of available caches; and
provide the caching strategy to the application, in response to which the application caches data based on the caching strategy;
determining a cache miss percentage of the application;
automatically determining a second caching strategy based on the cache miss percentage;
providing the second caching strategy to the application, in response to which the application caches data based on the second caching strategy;
detecting a change to the metadata describing a size of one of the plurality of available caches; and
in response to detecting the change, changing the size of the one of the plurality of available caches in conformance with the change to the metadata.

16. A non-transitory medium according to claim 15, the program code executable by a computing system to:
monitor the application to generate monitoring data; and
based on the monitoring data, determine the cache miss percentage.

17. A non-transitory medium according to claim 15, the plurality of available caches comprising:
a process cache specific to the application;
an environment cache specific to an execution environment of the application; and
a distributed local cloud environment cache specific to a local cloud environment of the execution environment,
wherein the caching strategy specifies caching data in at least two of the process cache, the environment cache, and the distributed local cloud environment cache.

18. A non-transitory medium according to claim 15, the program code executable by a computing system to:

determine second caching requirements associated with a second application;

automatically determine a third caching strategy based on the second caching requirements and the metadata describing the plurality of available caches, the third caching strategy being different from the caching strategy; and provide the third caching strategy to the second application, wherein the second application caches data based on the third caching strategy.

19. A non-transitory medium according to claim 18, the plurality of available caches comprising:

a process cache specific to the application;

a second process cache specific to the second application;

an environment cache specific to an execution environment of the application;

a second environment cache specific to a second execution environment of the second application; and a distributed local cloud environment cache specific to a local cloud environment of the execution environment and of the second execution environment, wherein the caching strategy specifies caching data in at least two of the process cache, the environment cache, and the distributed local cloud environment cache, and wherein the third caching strategy specifies caching data in at least two of the second process cache, the second environment cache, and the distributed local cloud environment cache.

20. A non-transitory medium according to claim 18, the program code executable by a computing system to:

monitor the application to generate monitoring data; and based on the monitoring data, determine the cache miss percentage.

\* \* \* \* \*